(12) United States Patent
Chung (10) Patent No.: US 10,819,202 B2
(45) Date of Patent: Oct. 27, 2020

(54) LINEAR VIBRATION MOTOR

(71) Applicant: Mplus CO., LTD., Suwon-si, Gyeonggi-do (KR)

(72) Inventor: Seuk Hwan Chung, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 1 day.

(21) Appl. No.: 16/445,432

(22) Filed: Jun. 19, 2019

(65) Prior Publication Data

US 2020/0021180 A1 Jan. 16, 2020

(30) Foreign Application Priority Data

Jul. 11, 2018 (KR) .................. 10-2018-0080644

(51) Int. Cl.
| | |
|---|---|
| *H02K 33/00* | (2006.01) |
| *H02K 33/04* | (2006.01) |
| *H02K 5/24* | (2006.01) |
| *G08B 6/00* | (2006.01) |
| *H04R 9/06* | (2006.01) |

(52) U.S. Cl.
CPC .............. *H02K 33/04* (2013.01); *H02K 5/24* (2013.01); *G08B 6/00* (2013.01); *H04R 9/06* (2013.01)

(58) Field of Classification Search
CPC .......... H02K 5/24; H02K 33/04; H02K 33/16; H02K 33/18; H02K 33/00; H02K 33/02; H02K 1/34; H02K 41/0356; B06B 1/045; H02P 25/032
USPC ......................................... 310/25, 15, 12.12
See application file for complete search history.

(56) References Cited

U.S. PATENT DOCUMENTS

| | | | | |
|---|---|---|---|---|
| 10,637,340 | B2* | 4/2020 | Shim | ........................ H02K 5/24 |
| 2013/0033127 | A1* | 2/2013 | Park | ........................ B06B 1/045 |
| | | | | 310/25 |

(Continued)

FOREIGN PATENT DOCUMENTS

| | | |
|---|---|---|
| KR | 10-2012-0051504 A | 5/2012 |
| KR | 10-2015-0035896 A | 4/2015 |

(Continued)

OTHER PUBLICATIONS

KIPO Office Action, dated Aug. 20, 2019, for Korean Patent Application No. 10-2018-0080644 which corresponds to the above-identified U.S. application.

*Primary Examiner* — Thanh Lam
(74) *Attorney, Agent, or Firm* — LRK Patent Law Firm (57) ABSTRACT

A linear vibration motor includes: a casing having an upper casing whose bottom is open and a lower casing coupled to the upper casing to form an internal space therein; a stator disposed on top of the lower casing in the internal space formed by the casing; an elastic member disposed around the stator in the internal space formed by the casing in such a manner as to allow one surface thereof to be coupled to the lower casing; an oscillator mounted on the other surface of the elastic member and having a ring-shaped magnet disposed around the stator; and a magnetic fluid applied to top of the ring-shaped magnet, wherein the upper casing includes a ring-shaped protrusion formed on the inner surface facing the lower casing, and an inner diameter of the ring-shaped protrusion is greater than an outer diameter of the ring-shaped magnet.

10 Claims, 6 Drawing Sheets

(56) References Cited

U.S. PATENT DOCUMENTS

| | | | | |
|---|---|---|---|---|
| 2013/0140918 A1* | 6/2013 | Choi | .................... | H02K 33/18 |
| | | | | 310/25 |
| 2014/0001889 A1* | 1/2014 | Hong | .................... | B06B 1/045 |
| | | | | 310/25 |
| 2015/0214822 A1* | 7/2015 | Kim | .................... | H02K 33/18 |
| | | | | 310/25 |
| 2016/0172950 A1* | 6/2016 | Shim | .................... | H02K 5/02 |
| | | | | 310/25 |

FOREIGN PATENT DOCUMENTS

| | | |
|---|---|---|
| KR | 10-2015-0053105 A | 5/2015 |
| KR | 10-1695828 B1 | 1/2017 |
| KR | 10-1783645 B1 | 10/2017 |
| KR | 10-2018-0055388 A | 5/2018 |

* cited by examiner

LINEAR VIBRATION MOTOR

CROSS REFERENCE TO RELATED APPLICATION

The present application claims priority to Korean Patent Application No. 10-2018-0080644, filed in the Korean Intellectual Property Office on Jul. 11, 2018, the entire content of which is incorporated herein by reference.

BACKGROUND OF THE INVENTION

1. Field of the Invention

The present invention relates to a linear vibration motor, and more particularly, to a linear vibration motor that is configured to reduce the noise generated during the operation thereof.

2. Description of Related Art

Generally, mobile terminals like smartphones have vibration functions (haptic functions) of interfacing call forwarding as well as of interfacing key input, event occurrence, and application execution to a user.

A vibration motor, which has such vibration function, is a part for converting an electromagnetic force into a mechanical driving force to generate vibrations, and the vibration motor is divided largely into a flat/coin type vibration motor and a linear type vibration motor according to its driving type and shape.

The flat type vibration motor generates vibrations by means of the rotation of a mass disposed therein and has rotational inertia remaining thereon. Accordingly, the linear vibration motor having no rotational inertia is generally used for a device requiring a fast response speed.

On the other hand, the linear vibration motor is designed to allow an electromagnetic force generated from a coil and a magnet and a physical elastic force generated from an elastic member to be resonant cooperatively with each other. In detail, if power in a specific frequency range having variable characteristics is applied to the coil to generate the electromagnetic force, the electromagnetic force and the magnetic force of the magnet are mutually operated, so that an oscillator is vibrated up and down, while being supported against the elastic force of the elastic member.

In the process where the oscillator of the linear vibration motor is vibrated up and down, however, if the vibration strength is increased, noise occurs from the oscillator. To solve the above-mentioned problems, a magnetic fluid is applied to one side of the oscillator, but if the linear vibration motor is operated for long hours, the magnetic fluid spreads outward according to its physical characteristics, so that it fails to achieve impact absorption or noise reduction.

Accordingly, there is a need for developing a linear vibration motor capable of preventing the magnetic fluid from moving to ensure the reliability thereof.

SUMMARY OF THE INVENTION

Accordingly, the present invention has been made in view of the above-mentioned problems occurring in the related art, and it is an object of the present invention to provide a linear vibration motor that is capable of preventing a magnetic fluid applied to an oscillator from moving.

It is another object of the present invention to provide a linear vibration motor that is capable of ensuring reliability in the operation thereof.

The technical problems to be achieved through the present invention are not limited as mentioned above, and other technical problems not mentioned herein will be obviously understood by one of ordinary skill in the art through the following description.

To accomplish the above-mentioned objects, according to the present invention, there is provided a linear vibration motor including: a casing having an upper casing whose bottom is open and a lower casing coupled to the upper casing to form an internal space therein; a stator disposed on top of the lower casing in the internal space formed by the casing; an elastic member disposed around the stator in the internal space formed by the casing in such a manner as to allow one surface thereof to be coupled to the lower casing; an oscillator mounted on the other surface of the elastic member and having a ring-shaped magnet disposed around the stator; and a magnetic fluid applied to top of the ring-shaped magnet, wherein the upper casing includes a ring-shaped protrusion formed on the inner surface facing the lower casing, and an inner diameter of the ring-shaped protrusion is greater than an outer diameter of the ring-shaped magnet.

According to the present invention, desirably, the ring-shaped protrusion has the same shape as the ring-shaped magnet.

According to the present invention, desirably, the oscillator includes: a ring-shaped weight disposed around the ring-shaped magnet and serving to amplify vibrations; and a ring-shaped yoke disposed between the ring-shaped magnet and the ring-shaped weight to form a magnetic closed circuit, and the inner diameter of the ring-shaped protrusion is greater than or equal to an outer diameter of the ring-shaped yoke.

According to the present invention, desirably, the ring-shaped protrusion is a ring-shaped protruding member attached to the inner surface of the upper casing facing the lower casing.

According to the present invention, desirably, the ring-shaped protruding member is made of a softer or harder material than the upper casing.

According to the present invention, desirably, the ring-shaped protrusion is a ring-shaped groove concave downward from the outer surface of the upper casing.

According to the present invention, desirably, the upper casing further includes a buffer disposed on the inner surface facing the lower casing, and a diameter of the buffer is greater than or equal to an inner diameter of the ring-shaped magnet and less than or equal to the inner diameter of the ring-shaped protrusions.

According to the present invention, desirably, the buffer is a flat plate buffering member attached to the inner surface of the upper casing facing the lower casing.

According to the present invention, desirably, the flat plate buffering member is made of a softer or harder material than the upper casing.

According to the present invention, desirably, the buffer is a flat plate groove concave downward from the outer surface of the upper casing.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention is in detail explained with reference to the attached drawings. In the description, it should be noted that the parts corresponding to those of the drawings are indicated by corresponding reference numerals. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

All terms (including technical or scientific terms) used herein, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. An expression referencing a singular value additionally refers to a corresponding expression of the plural number, unless explicitly limited otherwise by the context.

In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Figure 1A:
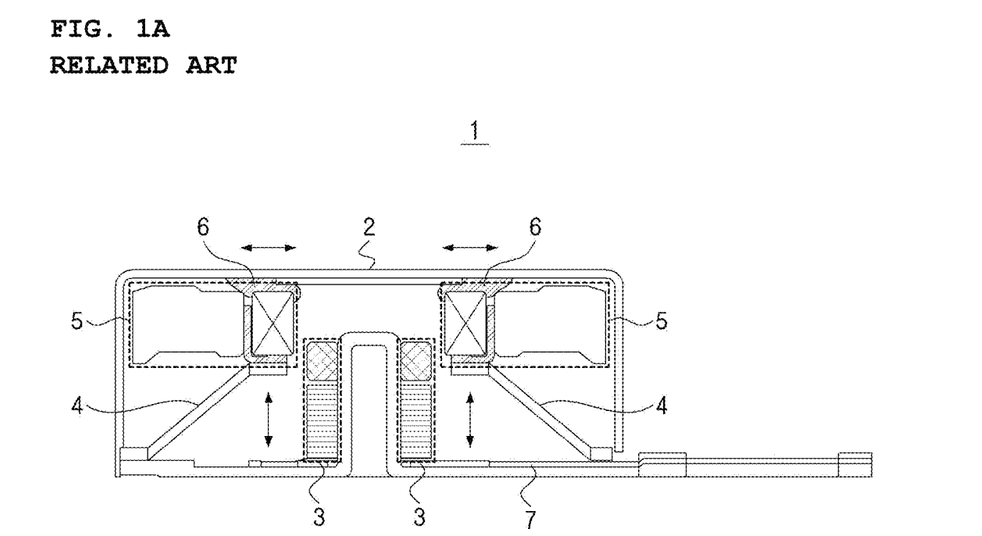
FIG. 1A is a sectional view showing a shape of a magnetic fluid moving in a conventional linear vibration motor.
Figure 1B:
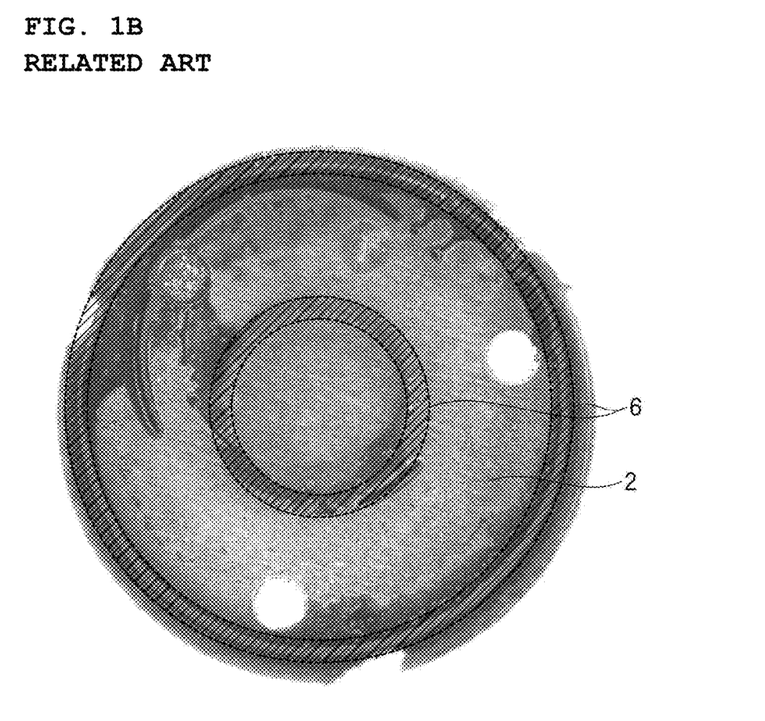
FIG. 1B is a photograph showing a state where the magnetic fluid moves by means of vibrations of the conventional linear vibration motor.

FIG. 1A is a sectional view showing a shape of a magnetic fluid 6 moving in a conventional linear vibration motor 1 and FIG. 1B is a photograph showing a state where the magnetic fluid 6 moves by means of vibrations of the conventional linear vibration motor 1.

As shown in FIG. 1A, the conventional linear vibration motor 1 includes a casing 2, a stator 3, an elastic member 4, an oscillator 5, a magnetic fluid 6, and a substrate 7. If an electric current is supplied to the stator 3 from the substrate 7 to generate an electromagnetic force, the stator 3 is cooperatively operated with the oscillator 4 disposed around the stator 3, so that the oscillator 4 is vibrated up and down, while being supported against elasticity of the elastic member 4. At this time, the magnetic fluid 6 is applied to top of a magnet 5a of the oscillator 5 to prevent the oscillator 5 vibrated up and down from colliding directly with the casing 2, but the magnetic fluid 6 colliding with the casing 2 becomes spread outward in a process where the oscillator 5 is vibrated up, thereby failing to perform its original collision prevention function.

As shown in FIG. 1B, if the conventional linear vibration motor 1 is used for long hours, it can be checked that the magnetic fluid 6 spreads to a shape of a hatched circle up to the periphery of the casing 2. In this state, the magnetic fluid 6 does not perform its original collision prevention function, which lowers the reliability of the linear vibration motor 1.

Figure 2A:
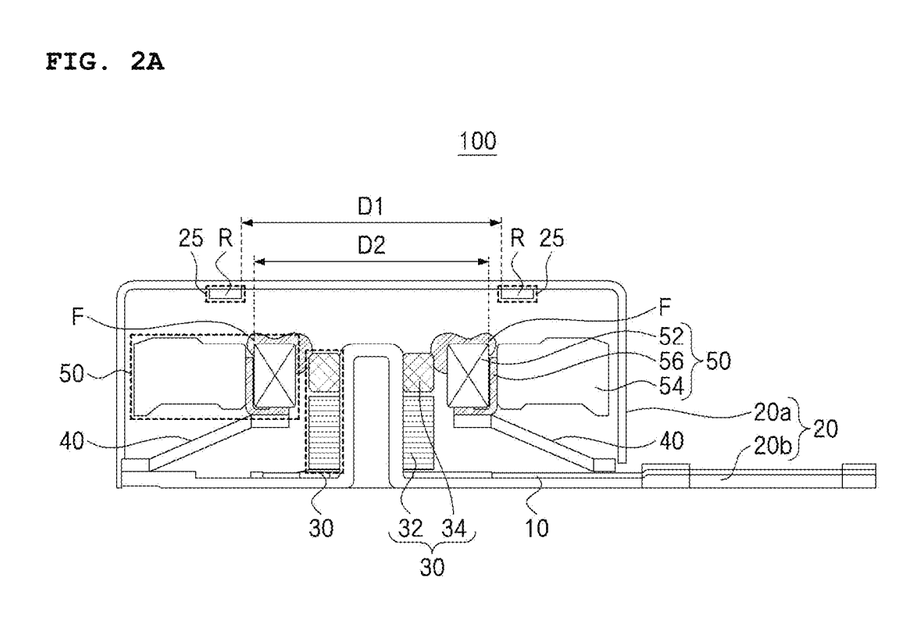
FIG. 2A is a sectional view showing a linear vibration motor according to a first embodiment of the present invention.
Figure 2B:
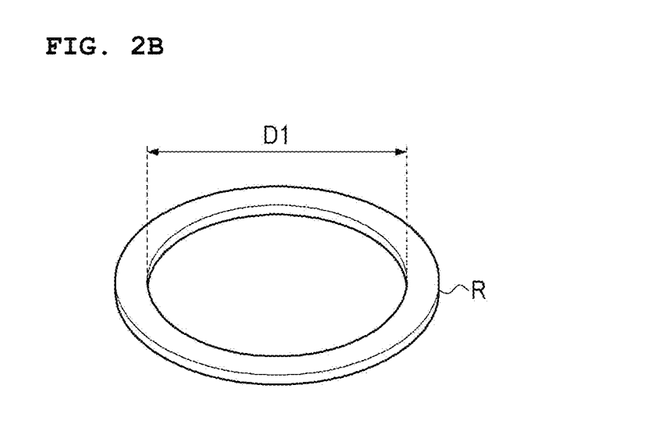
FIG. 2B is a perspective view showing a ring-shaped protrusion on the linear vibration motor according to the first embodiment of the present invention.

FIG. 2A is a sectional view showing a linear vibration motor 100 according to a first embodiment of the present invention, and FIG. 2B is a perspective view showing a ring-shaped protrusion 25 on the linear vibration motor according to the first embodiment of the present invention.

As shown in FIG. 2A, the linear vibration motor 100 according to the first embodiment of the present invention includes a substrate 10, a casing 20, a stator 30, an elastic member 40, an oscillator 50, and a magnetic fluid F.

The casing 20 includes an upper casing 20a whose bottom is open and a lower casing 20b coupled to the upper casing 20a to form an internal space therein. Further, the lower casing 20b may be an acoustic diaphragm which is vibrated by means of the electromagnetic force between the oscillator 50 and the stator 30 to thus generate sounds.

The substrate 10 is disposed on top of the lower casing 20b in such a manner as to allow a portion thereof to be exposed outward from the linear vibration motor 100 to receive power from the outside. Further, the substrate 10 supplies the power received from the outside to the stator 30.

The casing 20 has a cylindrical shape, but it may have a shape of a square casing or polygonal casing, while being not necessarily limited thereto. Also, the substrate 10 and the elastic member structure 40 housed in the casing 20 have the same square or polygonal shape as the casing 20.

The stator 30 is disposed on top of the lower casing 20b in the internal space formed by the casing 20 and includes a coil 32 and a coil yoke 34. According to the present invention, the coil 32 may be a sound coil that generates magnetic fields having different directions and strengths. In more detail, if an alternating current is applied to the coil 32 through the substrate 10, an alternating magnetic field is generated from the coil 32, so that the lower casing 20b coming into contact with the coil 32 is vibrated to generate a sound signal in an audible frequency range, thereby generating sounds.

The coil yoke 34 is disposed in parallel with the coil 32 and serves to amplify the electromagnetic force generated from the coil 32.

The elastic member 40 is disposed around the stator 30 on top of the lower casing 20b in the internal space formed by the casing 20 and serves to support the oscillator 50.

One surface of the elastic member 40 is fixed to the lower casing 20b, and the other surface thereof is coupled to the oscillator 50 to support the oscillator 50. Further, the elastic member 40 is decreased in diameter as it goes from the bottom to the top thereof and amplifies the up and down vibrations of the oscillator 50 by means of the elasticity thereof.

The oscillator 50 includes a ring-shaped magnet 52, a ring-shaped weight 54, and a ring-shaped yoke 56, and the oscillator 50 is mounted on the elastic member 40 in the internal space formed by the casing 20 in such a manner as to surround the stator 30. If an alternating current is applied to the stator 30 from the substrate 10, the oscillator 50 can be vibrated through the cooperative operation with the electromagnetic force generated from the stator 30.

Though the ring-shaped magnet 52 is one in FIG. 2A, it may include two or more ring-shaped magnets coupled to each other to generate stronger electromagnetic force.

The weight 54 of the oscillator 50 is disposed around the ring-shaped magnet 52 and serves to amplify the vibrations of the ring-shaped magnet 52. Further, an outer diameter of the ring-shaped weight 54 is smaller than an inner diameter of the casing 20, so that in a process where the entire oscillator 50 is vibrated up and down, the contact of the oscillator 50 with the casing 20 is prevented to ensure the reliability of the linear vibration motor 100.

The ring-shaped yoke 56 of the oscillator 50 is disposed between the ring-shaped magnet 52 and the ring-shaped weight 54 in such a manner as to come into contact with the ring-shaped magnet 52 and the ring-shaped weight to serve to form a closed magnetic circuit capable of allowing the magnetic field generated from the ring-shaped magnet 52 to gently flow.

The magnetic fluid F is applied to top of the ring-shaped magnet 52 to prevent the oscillator 50 vibrated up and down from physically colliding with the casing 20, thereby suppressing the noise caused by the vibrations of the linear vibration motor 100.

The ring-shaped protrusion 25 is formed on the inner surface of the upper casing 20a and serves to maintain the magnetic fluid F applied to the top of the ring-shaped magnet 52 to a shape of a circle, without any change in shape, in spite of the operation of the linear vibration motor 100 for long hours. In more detail, the ring-shaped protrusion 25 is formed on the inner surface of the upper casing 20a facing the lower casing 20b, and an inner diameter D1 of the ring-shaped protrusion 25 is greater than an outer diameter D2 of the ring-shaped magnet 52. The ring-shaped protrusion 25 can prevent the magnetic fluid F applied to the top of the ring-shaped magnet 52 from moving.

As shown in FIG. 2B, the ring-shaped protrusion 25 is a ring-shaped protruding member R, and the ring-shaped protruding member R is attached to the inner surface of the upper casing 20a facing the lower casing 20b.

Further, the ring-shaped protruding member R is made of a soft material, like a plastic material, which is not harder than the upper casing 20a, thereby maintaining the shape of the magnetic fluid F applied, and otherwise, the ring-shaped protruding member R is made of a harder material, like brass or stainless steel, than the upper casing 20a, thereby more reliably preventing the magnetic fluid F from moving to the outer periphery of the ring-shaped protrusion 25.

Up to now, an explanation on the structure of the linear vibration motor 100 wherein the movement of the magnetic fluid F is prevented according to the first embodiment of the present invention has been given, and now, another structure of the ring-shaped protrusion 25 formed on the casing 20 will be explained.

Figure 3A:
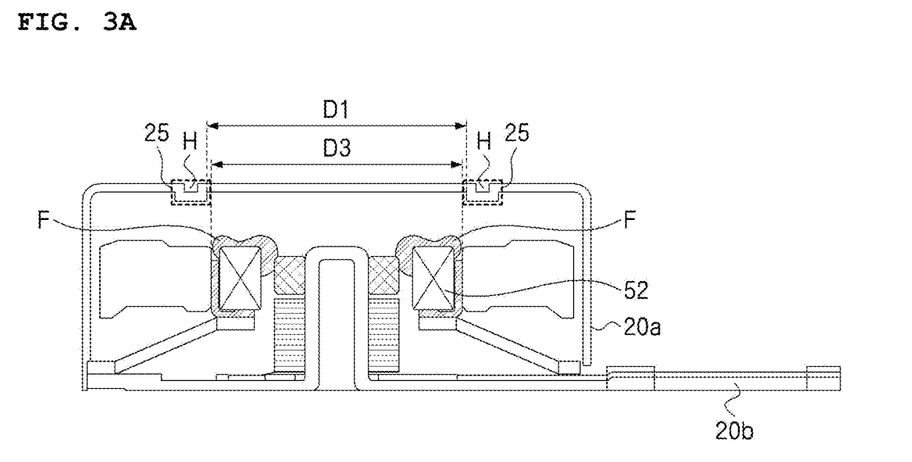
FIG. 3A is a sectional view showing a linear vibration motor according to a second embodiment of the present invention.
Figure 3B:
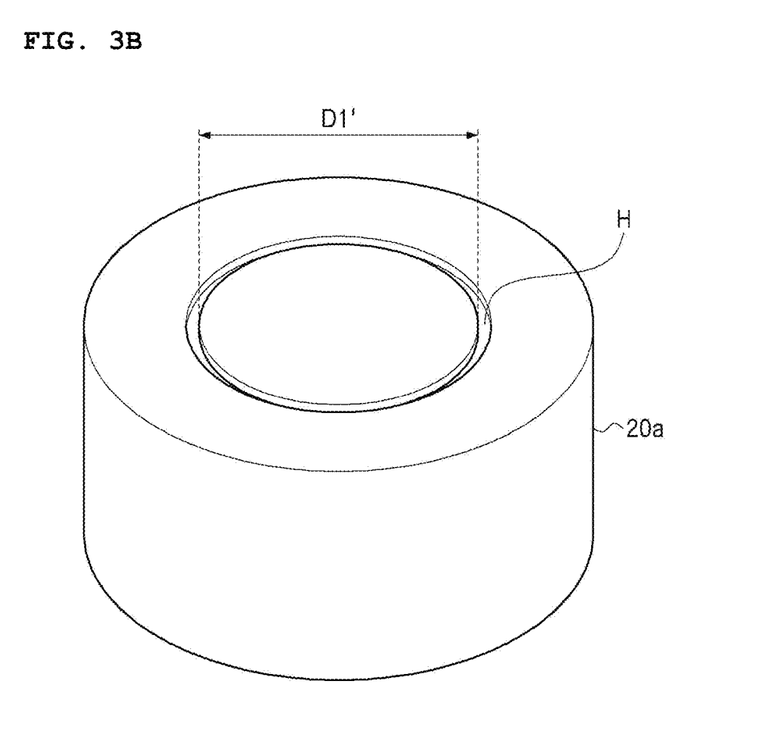
FIG. 3B is a perspective view showing an upper casing having a ring-shaped protrusion on the linear vibration motor according to the second embodiment of the present invention.

FIG. 3A is a sectional view showing a linear vibration motor 100 according to a second embodiment of the present invention, and FIG. 3B is a perspective view showing an upper casing 20a having a ring-shaped protrusion 25 on the linear vibration motor 100 according to the second embodiment of the present invention.

Referring to FIG. 3A, the linear vibration motor 100 according to the second embodiment of the present invention will be explained, but at this time, different components from those in the linear vibration motor 100 according to the first embodiment of the present invention will be described. In detail, only the ring-shaped protrusion 25 of the linear vibration motor as shown in FIG. 3A is different in structure from that of the linear vibration motor as shown in FIG. 2A, and therefore, an explanation on the ring-shaped protrusion 25 of the linear vibration motor 100 according to the second embodiment of the present invention will be given below.

The ring-shaped protrusion 25 as shown in FIGS. 3A and 3B is not the ring-shaped protruding member R attached to the upper casing 20a but a ring-shaped groove H concave downward from the outer surface of the upper casing 20a. The ring-shaped protrusion 25 is formed in an injection molding process of the upper casing 20a in such a manner as to have a diameter smaller than the outer diameter D2 of the ring-shaped magnet 52.

Further, a minimum inner diameter D1' of the ring-shaped groove H formed on the outer surface of the upper casing 20a and the minimum inner diameter D1 of the ring-shaped protruding member R attached to the inner surface of the upper casing 20a are the same as an outer diameter D3 of the ring-shaped yoke 56 in consideration of the mobility of the magnetic fluid F applied to the top of the ring-shaped magnet 52.

Though the ring-shaped protrusion 25 has a shape of a ring in FIGS. 2A to 3B, but it may have a polygonal shape, without being limited thereto. So as to more reliably prevent the magnetic fluid F applied to the top of the ring-shaped magnet 52 from moving, however, the ring-shaped protrusion 25 desirably has the same shape as the ring-shaped magnet 52.

Up to now, an explanation on the structures of the ring-shaped protrusions 25 on the linear vibration motors 100 according to the first and second embodiments of the present invention has been given, and now, a linear vibration motor 100 capable of preventing the movement of the magnetic fluid F will be explained.

Figure 4:
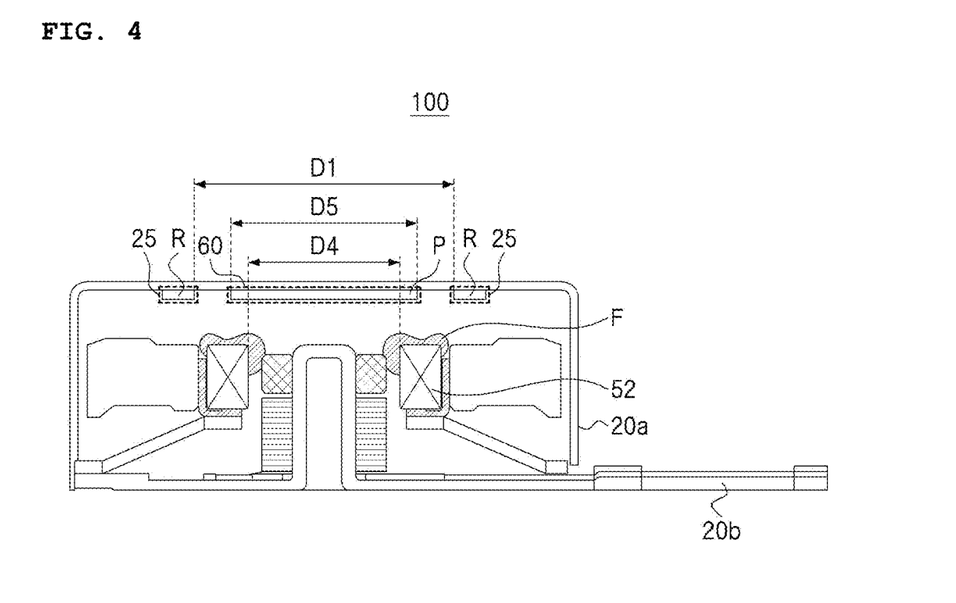
FIG. 4 is a sectional view showing a linear vibration motor according to a third embodiment of the present invention.

FIG. 4 is a sectional view showing the linear vibration motor 100 according to a third embodiment of the present invention.

As shown in FIG. 4, the linear vibration motor 100 according to the third embodiment of the present invention includes a buffer 60 disposed on the inner surface of the upper casing 20a having the ring-shaped protrusion 25. In more detail, the buffer 60 is disposed on the inner surface of the upper casing 20a facing the lower casing 20b, and a diameter D5 of the buffer 60 is greater than an inner diameter D4 of the ring-shaped magnet 52 and less than the inner diameter D1 of the ring-shaped protrusions 25. The buffer 60 serves to maintain the magnetic fluid F applied to the top of the ring-shaped magnet 52 to a shape of a circle, without any change in shape, in spite of the operation of the linear vibration motor 100 for long hours.

The buffer 60 has a shape of a flat plate buffering member P, and the flat plate buffering member P is attached to the inner surface of the upper casing 20*a* facing the lower casing 20*b*. Also, the flat plate buffering member P is made of a soft material, like a plastic material, which is not harder than the upper casing 20*a*, thereby maintaining the shape of the magnetic fluid F applied, and otherwise, the flat plate buffering member P is made of a harder material, like brass or stainless steel, than the upper casing 20*a*, thereby more reliably preventing the magnetic fluid F from moving to the center of the linear vibration motor 100.

Up to now, an explanation on the linear vibration motor 100 capable of preventing the movement of the magnetic fluid F according to the third embodiment of the present invention has been given, and now, another structure of the buffer 60 disposed on the upper casing 20*a* will be explained.

Figure 5A:
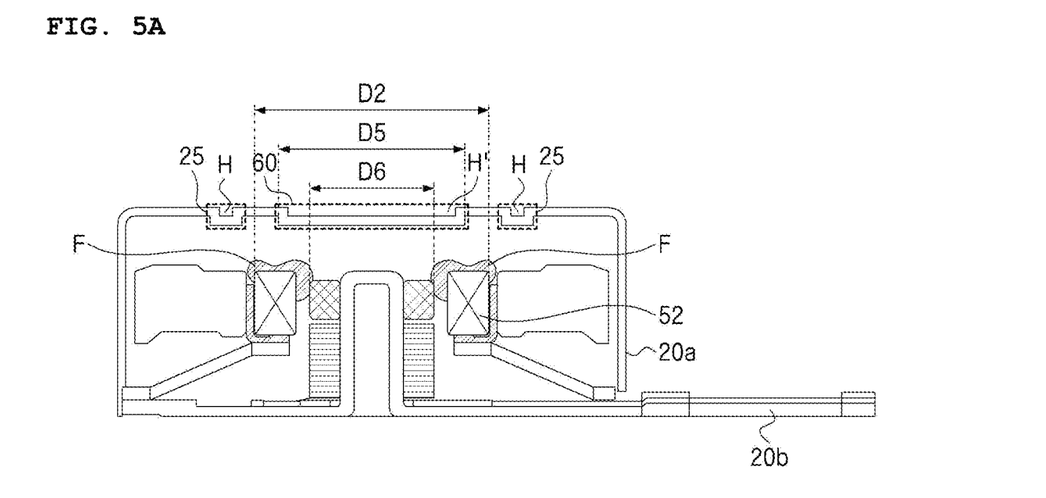
FIG. 5A is a sectional view showing a linear vibration motor according to a fourth embodiment of the present invention.
Figure 5B:
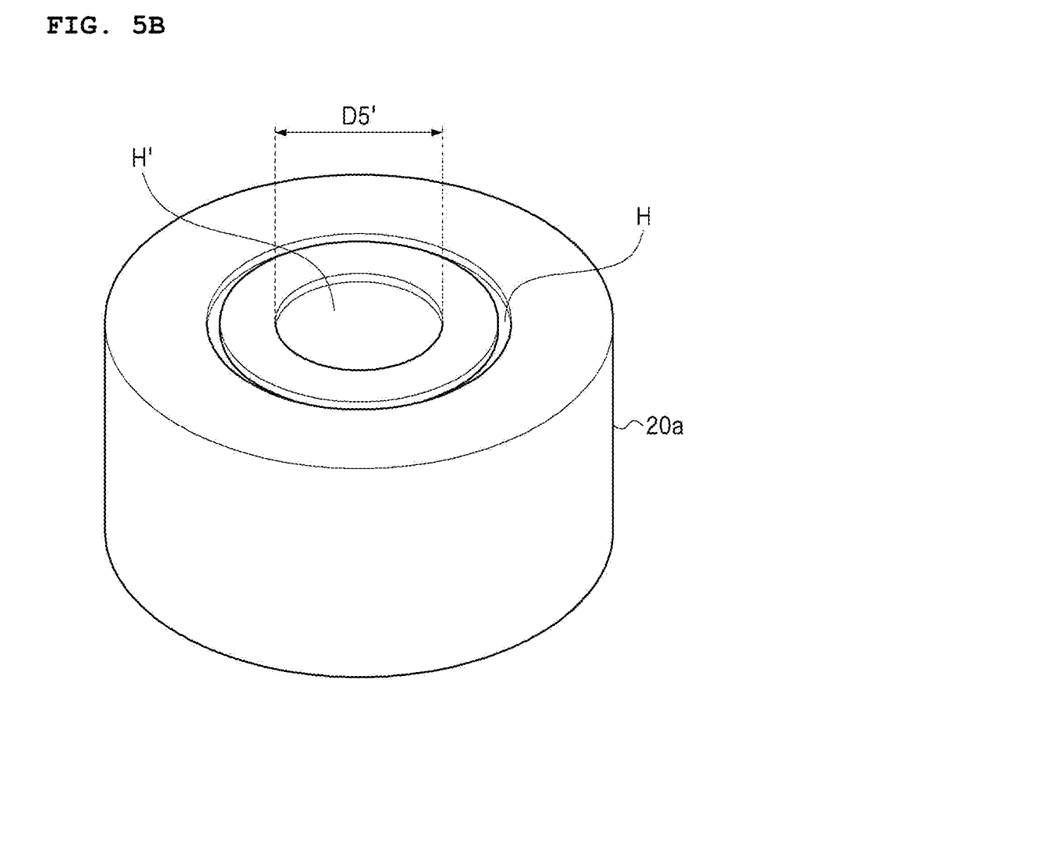
FIG. 5B is a perspective view showing an upper casing having a buffer on the linear vibration motor according to the fourth embodiment of the present invention.

FIG. 5A is a sectional view showing a linear vibration motor 100 according to a fourth embodiment of the present invention, and FIG. 5B is a perspective view showing an upper casing 20*a* having a buffer 60 on the linear vibration motor 100 according to the fourth embodiment of the present invention.

As shown in FIGS. 5A and 5B, the buffer 60 on the linear vibration motor 100 according to the fourth embodiment of the present invention is not the flat plate buffering member P attached to the upper casing 20*a* but a flat plate groove H' concave downward from the outer surface of the upper casing 20*a*. To do this, the flat plate groove H' is formed in an injection molding process of the upper casing 20*a* in such a manner as to have a diameter smaller than the outer diameter D2 of the ring-shaped magnet 52.

Further, a minimum diameter D5' of the flat plate groove H' formed on the outer surface of the upper casing 20*a* and the minimum diameter D5 of the flat plate buffering member P attached to the inner surface of the upper casing 20*a* are the same as the outer diameter D6 of the stator 30 disposed around a support shaft of the lower casing 20*b* in consideration of the mobility of the magnetic fluid F applied to the top of the ring-shaped magnet 52.

As shown in FIGS. 4 to 5B, the ring-shaped protruding member R and the flat plate buffering member P are disposed on the upper casing 20*a* of the single linear vibration motor 100, and otherwise, the ring-shaped groove H and the flat plate groove H' are formed on the upper casing 20*a* of the single linear vibration motor 100. However, of course, the protrusion and the groove may be alternately formed, without being limited thereto.

Up to now, an explanation on the structures of the buffers 60 on the linear vibration motors 100 according to the third and fourth embodiments of the present invention has been given, and now, an internal structure changed in the linear vibration motor 100 while the linear vibration motor 100 is being operated will be explained.

Figure 6A:
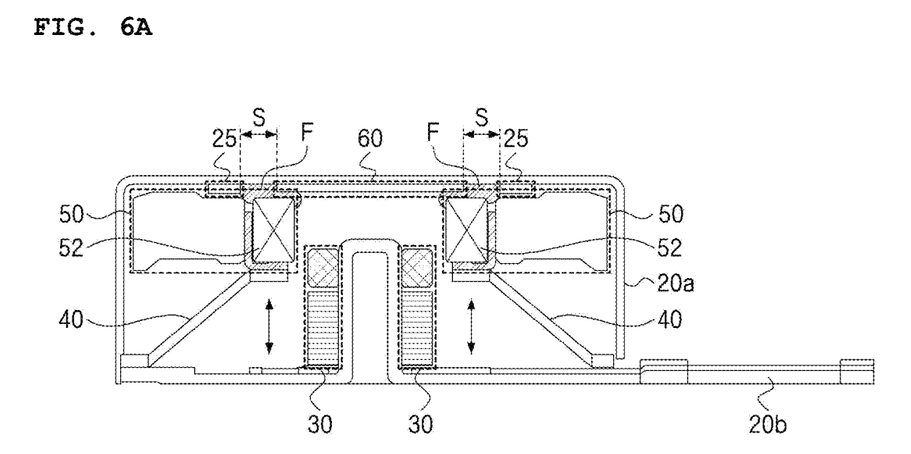
FIG. 6A is a sectional view showing a shape of a magnetic fluid moving in the linear vibration motor according to the third embodiment of the present invention.
Figure 6B:
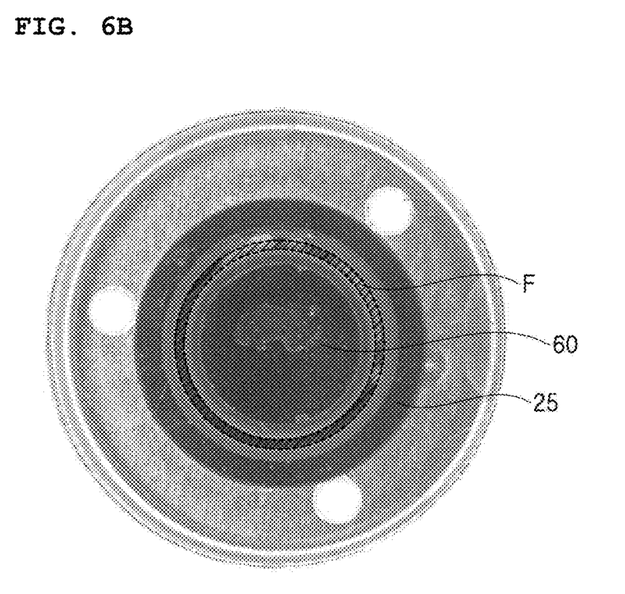
FIG. 6B is a photograph showing a state where the magnetic fluid moves by means of vibrations of the linear vibration motor according to the third embodiment of the present invention.

FIG. 6A is a sectional view showing a shape of a magnetic fluid F moving in the linear vibration motor 100 according to the third embodiment of the present invention, and FIG. 6B is a photograph showing a state where the magnetic fluid F moves by means of vibrations of the linear vibration motor 100 according to the third embodiment of the present invention.

In a process where the oscillator 50 of the linear vibration motor 100 is vibrated up and down, the magnetic fluid F applied to the top of the ring-shaped magnet 52 directly collides with the upper casing 20*a* so that it spreads to the periphery of the upper casing 20*a* from the top of the ring-shaped magnet 52, but as shown in FIG. 6A, the magnetic fluid F moves only within a distance S between the ring-shaped protrusion 25 and the buffer 60. Accordingly, the magnetic fluid F is fixed to its original position, that is, without having any escape from the top of the ring-shaped magnet 52, in a process where the linear vibration motor 100 is kept driven.

Even if the linear vibration motor 100 is operated for long hours, as shown in FIG. 6B, it can be checked that the magnetic fluid F is fixed to its original position by means of the ring-shaped protrusion 25 and the buffer 60, without being spread to the periphery of the upper casing 20*a*.

Like this, the linear vibration motor 100 according to the present invention is configured to have the ring-shaped protrusion 25 and the buffer 60 formed on the upper casing 20*a*, so that even if the linear vibration motor 100 is operated for long hours, the magnetic fluid F is fixed to its original position to prevent the oscillator from colliding with the casing 20, thereby maintaining the reliability of the linear vibration motor 100.

As described above, the linear vibration motor according to the present invention can physically prevent the magnetic fluid from moving therein.

In addition, the linear vibration motor according to the present invention can prevent the physical collision applied to the inside of the casing in a process where the oscillator is vibrated, thereby suppressing the generation of noise caused by the up and down vibrations.

Also, the linear vibration motor according to the present invention can allow the oscillator to be constantly vibrated even if it is operated for long hours, thereby maintaining the reliability thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A linear vibration motor comprising:
    a casing (20) having an upper casing (20*a*) whose bottom is open and a lower casing (20*b*) coupled to the upper casing (20*a*) to form an internal space therein;
    a stator (30) disposed on top of the lower casing (20*b*) in the internal space formed by the casing (20);
    an elastic member (40) disposed around the stator (30) in the internal space formed by the casing (20) in such a manner as to allow one surface thereof to be coupled to the lower casing (20*b*);
    an oscillator (50) mounted on the other surface of the elastic member (40) and having a ring-shaped magnet (52) disposed around the stator (30); and
    a magnetic fluid (F) applied to top of the ring-shaped magnet (52),
    wherein the upper casing (20*a*) comprises a ring-shaped protrusion (25) formed on the inner surface facing the lower casing (20*b*), and an inner diameter of the ring-shaped protrusion (25) is greater than an outer diameter of the ring-shaped magnet (52).

2. The linear vibration motor according to claim 1, wherein the ring-shaped protrusion (25) has the same shape as the ring-shaped magnet (52).

3. The linear vibration motor according to claim 1, wherein the oscillator (50) comprises:

a ring-shaped weight (54) disposed around the ring-shaped magnet (52); and a ring-shaped yoke (56) disposed between the ring-shaped magnet (52) and the ring-shaped weight (54), and the inner diameter of the ring-shaped protrusion (25) is greater than an outer diameter of the ring-shaped yoke (56).

4. The linear vibration motor according to claim 1, wherein the ring-shaped protrusion (25) is a ring-shaped protruding member (R) attached to the inner surface of the upper casing (20*a*) facing the lower casing (20*b*).

5. The linear vibration motor according to claim 4, wherein the ring-shaped protruding member (R) is made of a softer or harder material than the upper casing (20*a*).

6. The linear vibration motor according to claim 1, wherein the ring-shaped protrusion (25) is a ring-shaped groove (H) concave downward from the outer surface of the upper casing (20*a*).

7. The linear vibration motor according to claim 1, wherein the upper casing (20*a*) further comprises a buffer (60) disposed on the inner surface facing the lower casing (20*b*), and a diameter of the buffer (60) is greater than or equal to an inner diameter of the ring-shaped magnet (52) and less than or equal to the inner diameter of the ring-shaped protrusions (25).

8. The linear vibration motor according to claim 7, wherein the buffer (60) is a flat plate buffering member (P) attached to the inner surface of the upper casing (20*a*) facing the lower casing (20*b*).

9. The linear vibration motor according to claim 8, wherein the flat plate buffering member (P) is made of a softer or harder material than the upper casing (20*a*).

10. The linear vibration motor according to claim 7, wherein the buffer (60) is a flat plate groove (H') concave downward from the outer surface of the upper casing (20*a*).

* * * * *